United States Patent

Sidwell

[11] Patent Number: 5,806,553
[45] Date of Patent: Sep. 15, 1998

[54] FLUID PRESSURE CONTROL AND RELIEF APPARATUS

[76] Inventor: Herbert R. Sidwell, 5900 Mosteller Dr. #435, Oklahoma City, Okla. 73112

[21] Appl. No.: 651,029

[22] Filed: May 21, 1996

Related U.S. Application Data

[63] Continuation-in-part of Ser. No. 502,931, Jul. 17, 1995, abandoned.

[51] Int. Cl.$^6$ .................................................. F16K 31/12
[52] U.S. Cl. ..................................... 137/487.5; 137/489.5
[58] Field of Search ............................. 137/487.5, 489.5, 137/492, 492.5, 624.13

[56] References Cited

U.S. PATENT DOCUMENTS

| | | | |
|---|---|---|---|
| 3,548,866 | 12/1970 | Kalser et al. ............................. | 137/487 |
| 3,726,307 | 4/1973 | Carman et al. ....................... | 137/487.5 |
| 3,890,992 | 6/1975 | Wolz et al. ................................. | 137/14 |
| 4,394,871 | 7/1983 | Czajka et al. .......................... | 137/487.5 |
| 4,488,574 | 12/1984 | Bartholomaus ....................... | 137/487.5 |
| 4,796,661 | 1/1989 | Hishinuma et al. .................. | 137/487.5 |
| 4,860,787 | 8/1989 | Grosselin ............................... | 137/487.5 |
| 5,152,309 | 10/1992 | Twerdochlib et al. ................ | 137/487.5 |
| 5,152,316 | 10/1992 | Dorr ....................................... | 137/487.5 |
| 5,190,068 | 3/1993 | Philbin ................................. | 137/487.5 |
| 5,351,705 | 10/1994 | Reinders et al. ....................... | 137/487.5 |

*Primary Examiner*—Denise L. Ferensic
*Assistant Examiner*—Joanne Y. Kim
*Attorney, Agent, or Firm*—Robert K. Rhea

[57] ABSTRACT

Fluid pressure above a predetermined limit in a fluid pressure system is reduced by operating a relief valve, having its inlet port connected with the system, in a throttling action. A normally seated valve member is maintained in relief valve closed position by pneumatic pressure on a piston in a chamber of the relief valve. A fluid pressure sensor communicating with the inlet port generates a signal in response to fluid pressure above a predetermined limit received by a sensor signal processor energized by a source of electrical energy which releases pneumatic pressure in the chamber for a predetermined time interval allowing system fluid pressure to unseat the valve member and exhaust fluid pressure through the relief valve outlet port.

8 Claims, 3 Drawing Sheets

FLUID PRESSURE CONTROL AND RELIEF APPARATUS

This invention is a continuation-in-part of an application filed in the United States Patent and Trademark Office on Jul. 17, 1995, Ser. No. 08/502,931 for PRESSURE CONTROL AND RELIEF SYSTEM, now abandoned.

This invention relates to pressure relief valves and more particularly to an apparatus for monitoring and releasing fluid pressure before it reaches a critical value.

BACKGROUND OF THE INVENTION

1. Field of the invention

In process and power plant operation fluid pressures must be constantly controlled for the safety of personnel and equipment. This is usually accomplished by utilizing known safety relief valves such as spring, frangible disc or shear pin.

However, such valves are not always satisfactory for the reason over time the spring deteriorates in its accuracy of fluid pressure release. The frangible disc by being constantly flexed by the build up and decrease of fluid pressure crystallizes and may fail below the set pressure.

Similarly, a sheared pin may be replaced by a workman, tired of constantly replacing a sheared pin, inserting a pin of higher shear value such as an ALLEN wrench, thus, defeating the purpose of the relief valve.

This invention is an improvement over the above fluid control equipment by providing an independent fluid pressure sensing apparatus that monitors fluid pressure buildup and opens a fluid release valve to decrease fluid pressure before it reaches a critical value.

2. Description of The Prior Art

The most pertinent patent is believed to be U.S. Pat. No. 3,890,992 issued Jun. 24, 1975 to Wolz et al for METHOD AND APPARATUS FOR SAFEGUARDING PIPE-LINES AGAINST AN INADMISSIBLY HIGH INTERNAL COMPRESSIVE LOAD BY A CONTROL VALVE WITH A PNEUMATIC DRIVE. This patent discloses a relief valve on a pipeline pneumatically operated for relieving fluid pressure through a relief valve in which the fluid pressure in a pipeline is monitored and air supplied at a pressure that is a function of the monitored pressure to hold the relief valve in a closed position. If the rate of fluid pressure causes the rate of increase in air pressure to exceed a predetermined value, other valves are actuated to reduce the air pressure holding the relief valve closed, thus, allowing opening of the relief valve and the release of fluid pressure from the pipeline.

U.S. Pat. No. 3,548,866 issued Dec. 22, 1970 to Kaiser et al for SERVO-CONTROLLED HIGH PRESSURE RELIEF VALVE and U.S. Pat. No. 5,152,316 issued Oct. 6, 1992 to Dorr for SERVO DRIVE FOR SAFETY AND REGULATING VALVES are believed good examples of the further state-of-the-art.

The Kaiser et al patent uses a servo controlled valve for pressure feedback to operate the servo-valve as a pressure relief valve. This is accomplished by a transducer sensing fluid pressure and amplifiers and compensation circuits compared with a reference voltage to operate of the servo-valve and through a manifold pass fluid to a hydraulic cylinder in turn operating a conical valve as a pressure relief valve.

The Dorr patent discloses a servo-drive responsive to fluid pressure being monitored to operate a fast acting planetary gear arrangement that moves the spindle drive of a safety relief valve in an opening or closing direction for monitoring fluid pressure in a system.

This invention is believed distinctive over the above named patents by providing electro-pneumatic components that applies a source of gas pressure against the valve of a fluid pressure relief valve to normally maintain the relief valve closed. Self resetting fluid pressure sensing components monitor fluid pressure applied to a fluid pressure release valve for activating other components for bleeding off fluid pressure before reaching a predetermined critical value.

SUMMARY OF THE INVENTION

In a preferred embodiment a pressure relief valve is axially connected by its inlet port with a source of fluid pressure to be monitored. The relief valve includes a seated valve normally closing the inlet port by a source of pneumatic pressure acting on a piston or diaphragm connected with and normally maintaining the seated valve closed.

A first four-way solenoid valve is interposed between the pneumatic source of pressure and the piston or diaphragm.

A second normally open solenoid valve communicates with the relief valve inlet port. A pressure switch responsive to fluid pressure in the relief valve inlet port is connected with a relay timer in turn connected with the pilot of the four-way solenoid valve and the second normally open solenoid valve. A source of electrical energy maintains the timer and pressure switch energized.

In another embodiment the pressure switch is replaced by a pressure transducer and a microprocessor replaces the relay timer.

The principal object of this invention is to provide a fluid pressure monitoring and release system, which includes a normally closed pressure release valve having a normally closed inlet port and normally open outlet port in which excess pressure in the inlet port is sensed by fluid pressure self resetting components that bleeds fluid pressure from a chamber biasing the relief valve closed to allow the relief valve to open and reduce fluid pressure in the system being monitored.

A further object is to provide a fluid pressure relieving system of this class for monitoring very high fluid pressures in which monitored excessively high fluid pressure is lowered to an acceptable value by resetting pressure sensitive elements continually repeating the fluid pressure reducing function of the relief valve.

DESCRIPTION OF THE PREFERRED EMBODIMENTS

Like characters of reference designate like parts in those figures of the drawings in which they occur.

Figure 1:
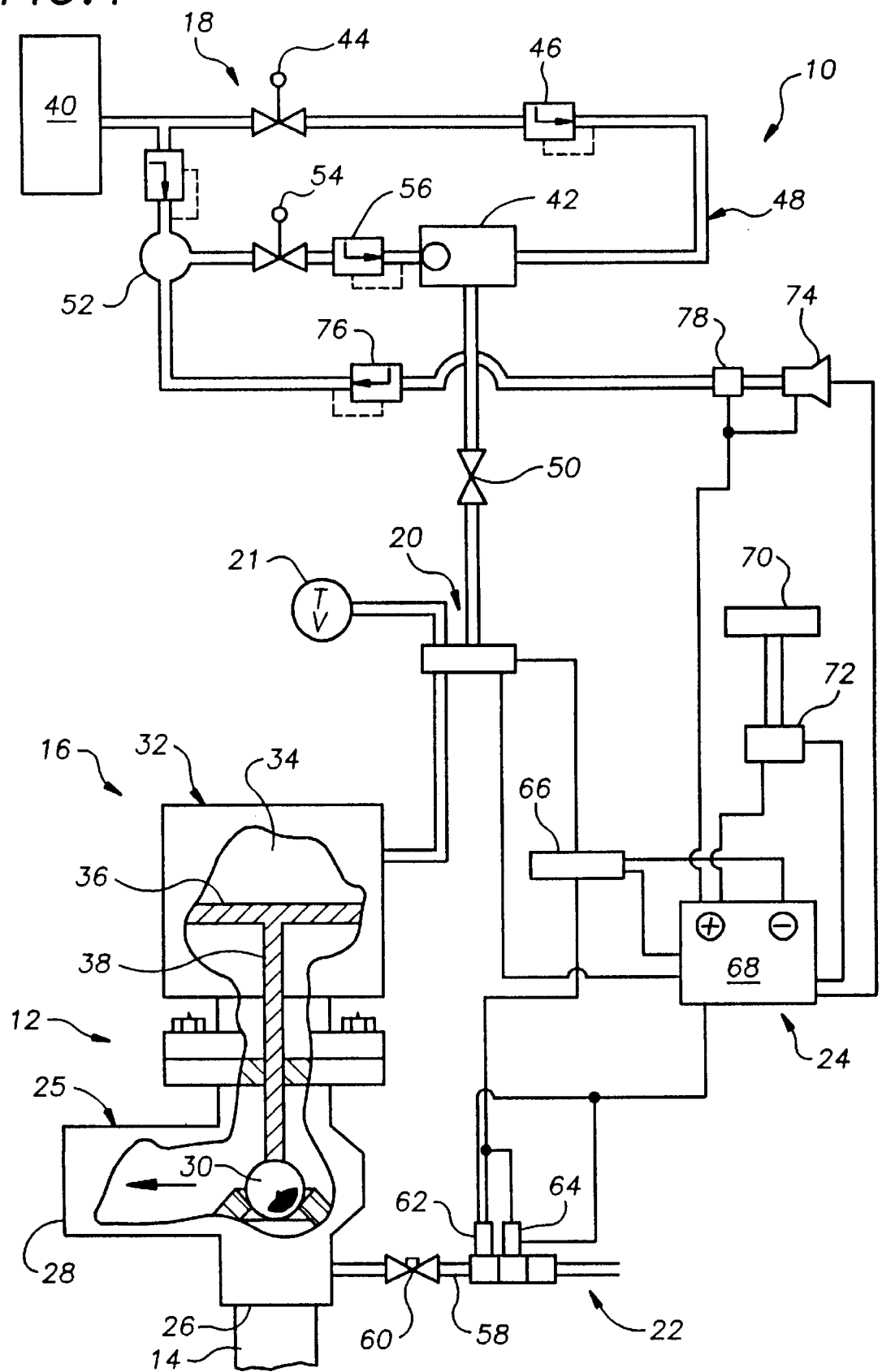
FIG. 1 is a diagram of a preferred embodiment.

Referring first to FIG. 1 the reference numeral 10 indicates the apparatus as a whole comprising a relief valve 12 monitoring fluid pressure in a vessel or line 14. The valve 12 is normally maintained in valve closed position by piston means 16 maintaining the relief valve closed by pneumatic means 18 connected with the piston means 16 through a four-way solenoid pilot operated valve means 20, having fluid throttling or bleeder valves 21 and 23, and responsive to fluid pressure sensing means 22 in combination with a source of electrical energy 24.

The relief valve means 12 comprises a valve body 25 having an inlet port 26 connected with the line 14 and an outlet port 28 forming a passageway through the valve body 25 normally closed by a valve 30 seated on a valve seat.

The piston means 16 comprises a cylinder 32 axially connected with the valve body 25 opposite the pipe 14 to form a chamber 34 containing a piston 36 having a piston rod 38 connected with the valve 30 opposite its seat for normally maintaining the valve 30 seated as presently explained.

The pneumatic means 18 includes a source of high pressure air 40 connected with a shuttle valve 42 through a control valve 44 and high pressure regulator 46 connected in series in one leg of a tubing loop 48, the shuttle valve 42 being connected in turn with the four-way solenoid valve means 20 through a needle valve 50.

The other leg of the tubing loop 48 includes a compressed air reservoir 52, initially charged by the source 40 and connected with the shuttle valve through a series connected stop valve 54 and low pressure regulator 56.

The pressure sensing means 22 includes a tubular fitting means 58 connected with the inlet port 26 of the valve means 12 by a restrictor valve 60. A normally closed pressure releasing solenoid valve 64 is connected with the tubing fitting means 58 downstream from the restrictor valve 60. A pressure sensitive switch 62 is interposed in the tubing fitting means 58 between the valve 60 and the solenoid valve 64.

The pressure switch 62 is connected with the source of electrical energy 24 through a sensor signal processing and timing means, such as a relay timer 66, in turn connected with the pilot of the four-way valve means 20 and the solenoid valve 64.

The source of electrical energy 24 includes a battery 68 maintained charged by a solar panel 70 connected with the battery through a voltage regulator 72.

An auxiliary source of compressed air includes a compressor 74 connected with the battery 68 and reserve tank 52 through a check valve 76. The compressor 74 is energized by a pneumatic switch 78 in the event the air pressure in the pneumatic means 18, including the reserve tank 52, falls below a predetermined limit.

Operation

In the operation of the apparatus illustrated by FIG. 1, the pressure switch 62 is set at a predetermined fluid pressure value in accordance with the requirements of the system being monitored. When the fluid pressure in the inlet port 26 reaches this predetermined value the pressure switch 62 energizes the adjustable relay timer 66 which opens the normally closed solenoid valve 64 to relieve the fluid pressure in the tubing fitting 58, which triggered the pressure switch 62, and simultaneously shifts the four-way solenoid valve means 20 to exhaust air pressure from the cylinder chamber 34 through the adjustable flow restrictor valve 21. Decreased air pressure in the cylinder chamber 34 allows the fluid pressure in the inlet port 26 to move the piston 36 and valve 30 off the valve seat to discharge excess fluid pressure through the valve outlet port 28. By adjusting the bleeder valves 21 and 23 on the exhaust side of the solenoid valve means 20, the opening cycle is throttled while pressure is being relieved. Similarly the needle valve 50 in the air line leading to the piston chamber 34 provides a means to adjust and throttle the closing cycle. Such flow adjustment features play a significant role in the prevention of "chattering" or the creation of pressure surges caused by the relief valve mechanism being abruptly opened or slammed shut.

When the relay of the timer 66 resets, the four-way valve means 20 is shifted to again apply air pressure to the chamber 34 and seat the valve 30 while simultaneously closing the normally closed solenoid valve 64 which completes one cycle of operation.

However, if the fluid pressure in the inlet port 26 still exceeds the predetermined value, the pressure switch 62 again energizes the timer 66 and the cycle is repeated which continues until the fluid pressure in the inlet port 26 has decreased to a value below the set value.

Figure 2:
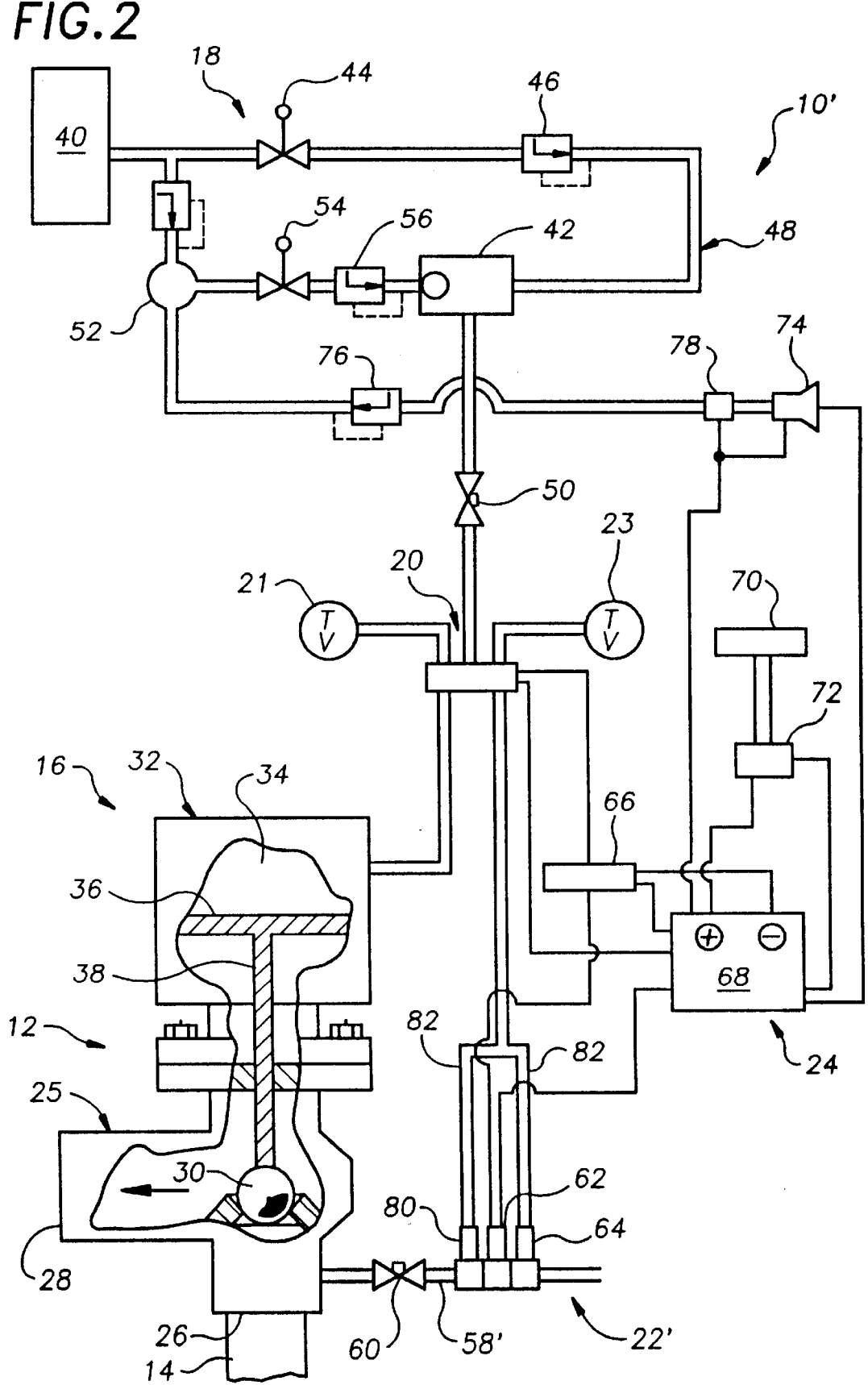
FIGS. 2 and 3 are similar diagrams illustrating alternative embodiments.

Referring also to FIG. 2, in which like components have reference numerals identical with FIG. 1 and modified components have prime numerals.

In the event the apparatus 10' is monitoring fluid pressure of extremely high values, the pressure sensing means 22' is modified by interposing a normally open solenoid valve 80 in the fitting 58' between the needle valve 60 and the pressure switch 62.

Thus, in operation of the apparatus of FIG. 2 fluid pressure in the inlet port 26 above a predetermined value triggers the pressure switch 62 energizing the pilot of the four-way valve means 20 to exhaust air pressure from the chamber 34 as described hereinabove.

When the pressure switch 62 is triggered the timer 66 shifts the solenoid valve means 20, as described hereinabove, and the normally open solenoid 80 is closed and the normally closed solenoid valve 64 is opened, by the relay timer resetting, creating a substantial pressure drop across the pressure switch 62 causing it to reset. If fluid pressure in the tubing fitting 58' is still above the predetermined limit, the cycle repeats and continues to repeat until the fluid pressure in the inlet port 26 reaches an acceptable value.

FIG. 2 also illustrates the use of pneumatic valves as an alternative in place of the valves 80 and 64, in which conduits 82 respectively connected with the four-way valve means 20 is exhausted through the valve means 20 fluid flow throttling valve 23 for limiting the rate of fluid discharge.

Figure 3:
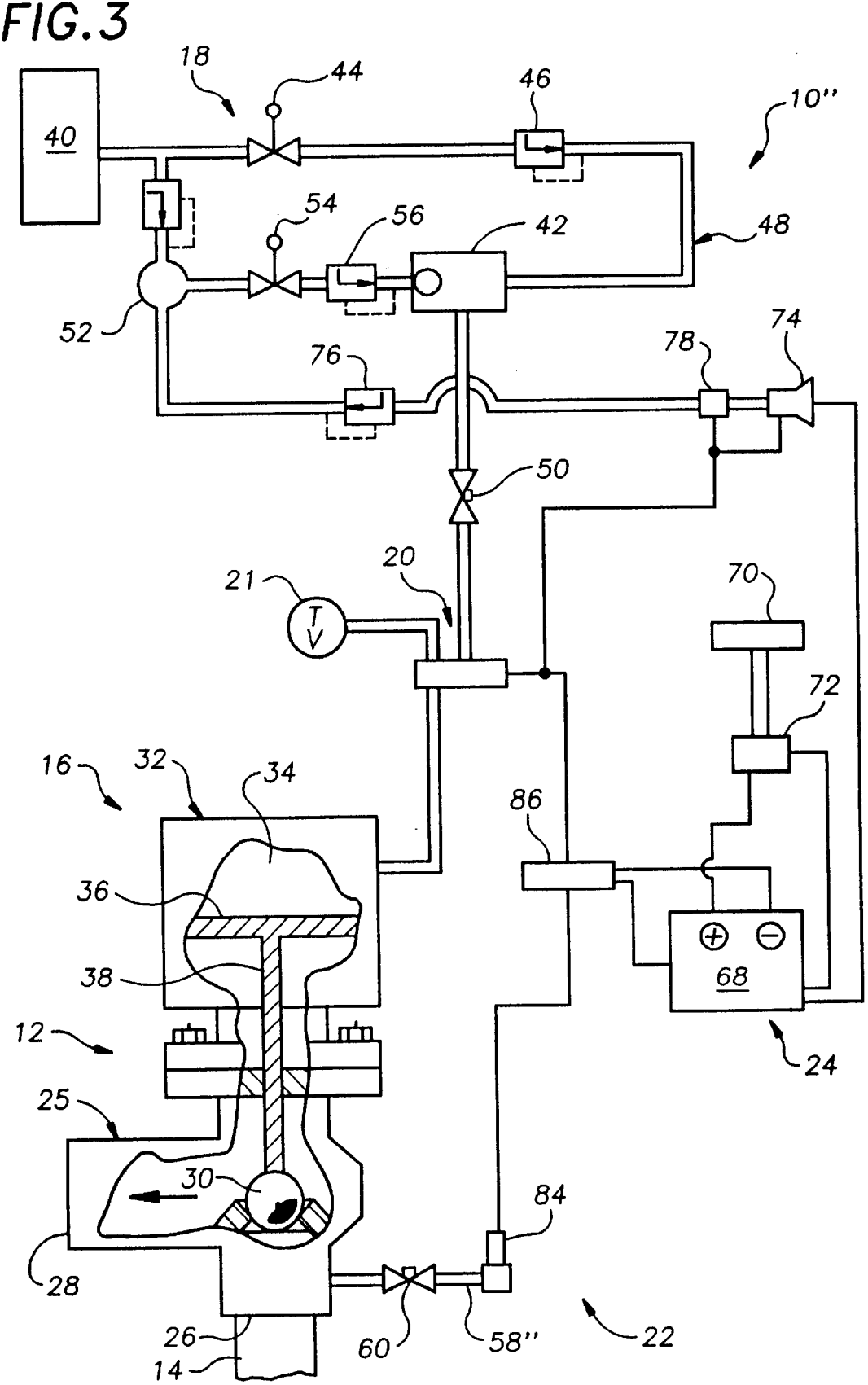

Referring also to FIG. 3 in which like components bear identical reference numerals with respect to the other Figures and modified components have double prime numerals.

In this embodiment, the pressure switch 62 is replaced by a transducer 84 connected with the modified tubing fitting means 58". The timer 66 is replaced by a microprocessor 86, similarly connected with the electrical energy source 22.

In operation of the apparatus 10" the transducer is similarly responsive to predetermined pressure values in the inlet port 26. The signal produced by the transducer is processed by the microprocessor 86 which shifts the valve means 20 to discharge fluid pressure from the chamber 34 through the throttling valve 21 allowing movement of the piston 36 in the ball valve opening movement for reducing pressure in the inlet port 26 to a predetermined value. Thereafter the microprocessor shifts the valve means 20 to pressurize the chamber 34 and reseat the valve 30 thus, completing one cycle of the transducer version of the apparatus.

In this embodiment, the microprocessor 86 is connected with the pneumatic switch 78 to energize the auxiliary compressor 74 for recharging the reserve air pressure tank 52.

Obviously the invention is susceptible to changes or alterations without defeating its practicability. Therefore, I do not wish to be confined to the preferred embodiment shown in the drawings and described herein.

I claim:

1. In a high pressure fluid system having a normally closed valve having a body and a valve seat in a fluid passageway between inlet and outlet ports and having a valve member seated on the valve seat, said inlet port being connected with the system fluid pressure being monitored, the improvement comprising:

a cylinder connected with said valve body for forming a chamber axially opposite the inlet port;

drive means in the chamber normally maintaining the valve member seated on the valve seat;

pressure control means including a first solenoid valve means connected with and pressurizing the chamber opposite the valve seat for normally biasing the drive means toward the valve seat;

fluid pressure sensing means connected with and responsive to fluid pressure in the inlet port for generating a sensor signal in response to fluid pressure above a predetermined value; and, sensor signal processing and timing means connected with a source of electrical energy and said first valve for shifting the latter and exhausting fluid from the chamber opposite the inlet port for a predetermined time interval, whereby fluid reducing pressure in the chamber allows inlet port fluid pressure to unseat the valve member.

2. The combination according to claim 1 in which the drive means includes:

a piston in said chamber; and, a piston rod connecting the piston with said valve member.

3. The combination according to claim 2 in which said pressure control means comprises:

a pneumatic system connected with a source under greater than atmospheric pressure.

4. The combination according to claim 3 in which the fluid pressure sensing means includes:

a pressure switch.

5. The combination according to claim 4 in which the sensor processing and timing means comprises:

a relay timer.

a microprocessor.

6. The combination according to claim 4 in which the fluid pressure sensing means further includes:

a second normally open solenoid valve interposed between said pressure switch and the inlet port;

a third normally closed solenoid valve connected with said pressure switch opposite the second solenoid valve, and in which the sensor processing and timing means further includes:

an adjustable relay timer for momentarily closing said second solenoid valve and simultaneously momentarily opening said third solenoid valve for creating a fluid pressure drop across said pressure switch of sufficient magnitude to reset the pressure switch.

7. The combination according to claim 3 in which the fluid pressure sensing means comprises:

a transducer.

8. The combination according to claim 7 in which the sensor processing and timing means comprises:

a microprocessor.

* * * * *